United States Patent [19]
Heap et al.

[11] 3,974,052
[45] Aug. 10, 1976

[54] PHOTOPOLYMERIZABLE COMPOSITIONS CONTAINING TRIKETONE/ALCOHOL ADDUCTS AS PHOTOSENSITIZERS

[75] Inventors: Nicholas Heap; Jozef Nemcek, both of Runcorn, England

[73] Assignee: Imperial Chemical Industries Limited, London, England

[22] Filed: Dec. 2, 1974

[21] Appl. No.: 528,924

[30] Foreign Application Priority Data
Dec. 6, 1973 United Kingdom............... 56623/73

[52] U.S. Cl. .................. 204/159.15; 96/115 P; 204/159.18; 204/159.23; 204/159.24; 260/47 UA; 260/77.5 CR; 260/859 R; 260/861; 260/864; 260/865; 260/872; 526/260; 526/312; 526/321; 526/328; 526/330; 526/341; 526/346
[51] Int. Cl.² ...................... C08F 8/00; C08F 2/46
[58] Field of Search.................. 204/159.18, 159.23, 204/159.24, 159.15; 96/115 P

[56] References Cited
UNITED STATES PATENTS

| | | | |
|---|---|---|---|
| 3,657,088 | 4/1972 | Heine et al. .................. | 204/159.15 |
| 3,689,565 | 9/1972 | Hoffmann et al. .................. | 260/590 |
| 3,715,293 | 2/1973 | Sandner et al. .................. | 204/159.14 |

Primary Examiner—Richard B. Turer
Attorney, Agent, or Firm—Cushman, Darby & Cushman

[57] ABSTRACT

A photopolymerizable composition comprising a polymerizable ethylenically unsaturated material and a photosensitizer, said photosensitizer being an addition product of an organic 1,2,3-triketone and an organic alcohol or organic mercaptan, said addition product having the formula

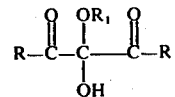

or

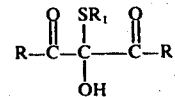

where the groups R and $R_1$ may be same or different and each is a hydrocarbyl group or a substituted hydrocarbyl group or the groups R when taken together form part or the whole of a cyclic structure.

19 Claims, No Drawings

PHOTOPOLYMERIZABLE COMPOSITIONS CONTAINING TRIKETONE/ALCOHOL ADDUCTS AS PHOTOSENSITIZERS

This invention relates to a photopolymerisable composition comprising an ethylenically unsaturated polymerisable material and a photosensitive catalyst, and to a process for the production of polymeric materials from said composition.

It is known to polymerise ethylenically unsaturated polymerisable materials by irradiating the materials with visible or ultraviolet radiation in the presence of a photosensitiser which is capable of absorbing the radiation to yield an excited species capable of initiating the polymerisation reaction.

It has also been proposed to polymerise an ethylenically unsaturated polymerisable material by irradiating the material in the presence of a photosensitive dye, e.g. rose bengal, and a reducing agent which is capable of reducing the photosensitive dye when the dye is in an excited state. The photosensitive dyes are in general highly coloured.

We have found that certain adducts of 1,2,3-triketones are useful photosensitisers for initiating polymerisation of polymerisable ethylenically unsaturated materials. The photosensitisers are colourless.

The compositions of the present invention are stable in the dark such that little if any polymerisation takes place after the composition has been standing for weeks or even months in the dark. Polymerisation of the ethylenically unsaturated material is initiated only under the influence of radiation of a suitable wavelength.

According to the present invention there is provided a photopolymerisable composition comprising at least one polymerisable ethylenically unsaturated material and as photosensitiser an addition product of a 1,2,3-triketone and an alcohol or mercaptan.

The photosensitiser may be used in combination with at least one reducing agent capable of reducing the photosensitiser when the latter is in an excited state. The presence of a reducing agent generally increases the rate of polymerisation achieved, though in some cases the increase may be only slight.

According to a further feature of the invention there is provided a process for the preparation of a polymeric material which comprises irradiating a photopolymerisable composition as defined in the penultimate preceding paragraph with radiation having a wavelength which is capable of being absorbed by the photosensitiser so as to convert the photosensitiser to an excited state.

The radiation may be visible light or ultraviolet or actinic radiation or radiation which includes within its spectrum radiation of visible, ultraviolet and/or actinic wavelengths. Suitably, the radiation may have a wavelength in the range 230 m$\mu$ to 600 m$\mu$. Sunlight may be used as the source of radiation although the wavelength of radiation to be used will be determined by the particular photosensitiser in the composition, the radiation being of a wavelength such as to be absorbed by the photosensitiser so as to convert it to an excited state. A suitable wavelength may be chosen by means of simple experiment, for example by measuring the electronic absorption spectrum of the photosensitiser.

The photosensitisers are derived from 1,2,3-triketones having the formula

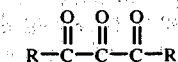

wherein the groups R, which may be the same or different, are hydrocarbyl groups or substituted hydrocarbyl groups or when taken together form part or the whole of a cyclic structure.

In general the groups R in the triketones, and hence in the photosensitisers derived from them, may be aliphatic or aromatic groups and it is to be understood that the groups R may be the same or different. For example, in the triketones of structure I both of the groups R may be aromatic, or both may be aliphatic, or one group R may be aromatic and the other aliphatic. However, for reasons of convenience in the preparation of the triketones, the groups R are preferably the same. Photosensitisers derived from triketones in which the groups R are aromatic groups are preferred.

Within the scope of the term aliphatic groups as used herein we include cycloaliphatic groups and aliphatic groups carrying aromatic substituents, i.e. alkaryl groups. Similarly, within the scope of the term substituents, group as used herein we include groups carrying alkyl substitutents, i.e. aralkyl groups.

The aromatic group may be a benzenoid aromatic group, e.g. the phenyl group, or it may be a non-benzenoid cyclic group which is recognised in the art as possessing the characteristics of a benzenoid aromatic group.

The groups R, especially when they are aromatic groups, may carry substituents other than hydrocarbyl groups, e.g. halogen atoms or alkoxy groups, provided the photosensitiser containing the substituent groups is not present in the photopolymerisable composition in such a concentration as to result in substantial inhibition of polymerisation of the ethylenically unsaturated material in the composition.

In the triketones having the structure I each of the groups R preferably is an aromatic group and especially preferred is the triketone in which each R group is the phenyl group, i.e. 1,3-diphenyl propane-1,2,3-trione.

Any alcohol or mercaptan which reacts with the triketone can be employed to form the photosensitisers. Aliphatic and aromatic alcohols and mercaptans, and mixtures thereof, may be employed. The addition products have the formula

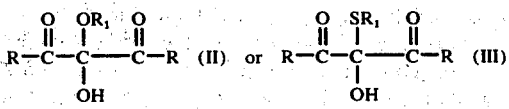

where R is as hereinbefore defined and $R_1$ is a hydrocarbyl or a substituted hydrocarbyl group. Compounds of formula II or III are obtained by reacting triketones with alcohols $R_1OH$ or mercaptans $R_1SH$ and examples of alcohols which may be used in which $R_1$ is a substituted hydrocarbyl group are hydroxyethyl methacrylate and 2-methoxyethan-1-ol. Examples of suitable alcohols in which $R_1$ is a hydrocarbyl group are alkanols wherein the alkyl group contains from 1 to 20 carbon atoms, and aromatic alcohols, for example phenol. It is to be understood that for convenience the above examples are all alcohols but that the corresponding mercaptans also are suitable. Aliphatic alcohols and mercaptans are preferred.

The photosensitiser may be added as a preformed compound to the polymerisable ethylenically unsaturated material to form the photopolymerisable compositions of the invention, or it may be formed in situ prior to effecting the polymerisation reaction.

The photosensitiser may be present in the photopolymerisable composition in a concentration, for example, in the range 0.001% to 10% by weight of the ethylenically unsaturated material in the composition, although concentrations outside this range may be used if desired. Suitably the photosensitiser is present in a concentration of 0.1% to 7%, and more preferably 0.5% to 5% by weight of the ethylenically unsaturated material in the composition.

As hereinbefore stated, a reducing agent may be present in the photopolymerisable composition to accelerate the rate of polymerisation of the ethylenically unsaturated material. The reducing agent should have a reduction potential such that it is capable of reducing the photosensitiser when the latter is in an excited state but is incapable of reducing the photosensitiser when the latter is not excited by radiation. Furthermore it is desirable, though not essential, that the reducing agent, when oxidised by the excited photosensitiser, should itself be capable of initiating polymerisation of the ethylenically unsaturated material. The reducing agent, at the concentration at which it is present in the photopolymerisable composition, should have little or no inhibiting effect on polymerisation. Whether or not a particular reducing agent has an inhibiting effect may be determined by means of simple experiment, for example by effecting polymerisation of the ethylenically unsaturated material by means of a free-radical initiator in the presence of, and in the absence of, the reducing agent in the desired concentration, and comparing the rates of polymerisation in the presence and absence of the reducing agent.

Suitable reducing agents include compounds having the structure

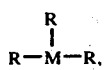

where M is an element of Group Vb of the Periodic Table of the Elements and the units R, which may be the same or different, are hydrogen atoms, hydrocarbyl groups, substituted hydrocarbyl groups or groups in which two units R together with the element M form a cyclic ring system, no more than two of the units R being hydrogen atoms, and where the element M is attached directly to an aromatic group R at least one of the groups R has

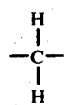

group attached to M. Preferably, the reducing agent having the structure

is free of aromatic groups attached directly to the element M.

The Periodic Table of the Elements referred to is that published in "Advanced Inorganic Chemistry", second edition, by F A Cotton and G Wilkinson (Interscience 1966).

The element M in the reducing agent may be, for example, phosphorous or more preferably nitrogen. If desired, M may be arsenic or antimony.

The reducing agent may be primary, secondary, or tertiary, that is, in the structure

two, one or none of the units R may be hydrogen atoms. For example the reducing agent may be a primary, secondary or tertiary amine or phosphine.

One or more of the groups R may be a hydrocarbyl group. The hydrocarbyl group may be, for example, an alkyl, cycloalkyl or alkaryl group. Suitably, the group R may be an alkyl group having from 1 to 10 carbon atoms.

Examples of suitable reducing agents in which one or more of the units R is a hydrocarbyl group include propylamine, n-butylamine, pentylamine, hexylamine, dimethylamine, diethylamine, dipropylamine, di-n-butylamine, dipentylamine, trimethylamine, triethylamine, tripropylamine, tri-n-butylamine, tripentylamine, dimethylaminoethyl methacrylate, and long chain fatty amines, e.g. $C_{18}H_{37}NMe_2$. Examples of reducing agents containing aromatic groups include N,N'-dimethyl aniline and N-methyl diphenylamine.

It is to be understood that throughout this specification where we refer to specific examples of suitable reducing agents in which the element M is nitrogen we also wish to include corresponding specific examples in which the element M is phosphorous, arsenic or antimony.

One or more of the units R may be a substituted hydrocarbyl group and in particular the hydrocarbyl group may carry a substituent having the structure

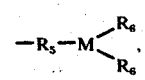

where M is an element of Group Vb of the Periodic Table of the Elements and the unit $R_5$ is, for example, an alkylene chain and the units $R_6$, which may be the same or different, are, for example, hydrogen atoms or hydrocarbyl groups.

Examples of reducing agents having the structure

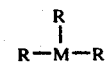

in which at least one of the units R is a substituted hydrocarbyl group include diamines of the structure

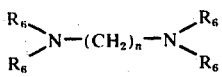

in which n is a whole number of at least two and the groups $R_6$, which may be the same or different, are hydrogen atoms or hydrocarbyl, especially alkyl, groups. For example, the reducing agent may be ethylene diamine, trimethylene diamine, tetramethylene diamine, pentamethylene diamine or hexamethylene diamine, or N-hydrocarbyl, especially N-alkyl, derivatives thereof. Other suitable reducing agents include derivatives having the structure

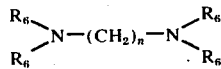

in which one or more of the hydrocarbon atoms in the -$CH_2$ unit carry an

group, especially an -$NH_2$ group.

Examples of reducing agents in which the element M forms part of a cyclic ring system include piperidine, and N-hydrocarbyl, especially N-alkyl, derivatives of piperidine.

Other reducing agents which may be used include triallylamine,

allyl thiourea, o-tolyl thiourea, soluble salts of aromatic sulphinic acids, e.g. S-benzyl iso-thiuronium p-toluene sulphinate and sodium diethyl dithiophosphate, and aminoacids, for example indol-3-acetic acid.

The concentration of the reducing agent may be in the ranges hereinbefore described in respect of the photosensitiser, although concentrations outside these ranges may be used if desired. Preferably, the reducing agent is present in a concentration of 1% to 5% by weight of the ethylenically unsaturated material in the photopolymerisable composition.

Where one or more of the groups R in the reducing agent

is aromatic then it is preferred to have a concentration of reducing agent in the photopolymerisable composition in the range 0.01% to 0.5% by weight of the ethylenically unsaturated material in the composition on account of the more rapid rates of polymerisation which may be obtained when the reducing agent is present in this concentration range.

The photosensitiser and the reducing agent, if present, desirably should be soluble in the ethylenically unsaturated material at least to an extent sufficient to give the desired concentration therein. Although polymerisation will proceed if the photosensitiser and reducing agent are not completely soluble it is much preferred that the photosensitiser and the reducing agent are together completely soluble in the ethylenically unsaturated material to the desired extent.

The method of mixing of the photosensitiser and reducing agent with the ethylenically unsaturated material may have a bearing on the success or otherwise of achieving the desired concentrations of photosensitiser and reducing agent therein.

Thus, where the photosensitiser or reducing agent is not sufficiently soluble in the ethylenically unsaturated material, or where one or the other may be dissolved only with difficulty, we have found that dissolution of the photosensitiser and/or reducing agent may be assisted by addition to the ethylenically unsaturated material of a small amount of a diluent in which the photosensitiser or reducing agent is soluble and which is miscible with the ethylenically unsaturated material. Suitably, the photosensitiser or reducing agent may be introduced into the ethylenically unsaturated material in the form of a solution in such a diluent.

The photosensitiser and reducing agent may be dissolved in the same batch of a suitable diluent and then added to the ethylenically unsaturated material. Alternatively, the photosensitiser and reducing agent may be dissolved in different batches of the same or different diluents and added to the ethylenically unsaturated material. The method of addition, the diluent or diluents, and the amounts thereof to be used will readily be determined by a skilled man.

In general, polymerisation of the ethylenically unsaturated material proceeds readily at ambient temperature when the composition is irradiated with radiation having a wavelength which converts the photosensitiser to an excited state. However, the rate of polymerisation may in general be increased by effecting the polymerisation at a temperature above ambient.

The polymerisable ethylenically unsaturated material, which preferably should be free-radically polymerisable, may be at least one monomer containing ethylenic unsaturation in a terminal group. For example, the ethylenically unsaturated material may be one or more monomers selected from vinyl monomers, allyl monomers and vinylidene monomers.

Suitable vinyl monomers which may be polymerised include, for example, vinyl esters, aromatic vinyl compounds and vinyl nitriles.

Vinyl esters suitable for use in the method of our invention include, for example, vinyl acetate and esters of acrylic acid having the structure $CH_2 = CH - COOR_7$, where $R_7$ is an alkyl, aryl, alkaryl, aralkyl or cycloalkyl group. For example, $R_7$ may be an alkyl group having from 1 to 20, preferably 1 to 10 carbon atoms. Particular vinyl esters which may be mentioned include, for example, methyl acrylate, ethyl acrylate, n- and isoproplacrylates, and n-, iso- and tertiary butyl acrylates.

Other suitable vinyl esters include, for example, esters of the formula $CH_2 = C(R_8)COOR_7$, where $R_8$ is methyl. In the ester of formula $CH_2 = C(R_8)COOR_7$, $R_7$ and $R_8$ may be the same or different. Particular vinyl esters which may be mentioned include, for example, methyl methacrylate, ethyl methacrylate, n- and isopropylmethacrylate, and n-, iso- and tertiary butyl methacrylate. Suitable aromatic vinyl compounds include, for example styrene and derivatives thereof, e.g. α-alkyl derivatives of styrene, e.g. α-methyl styrene, and vinyl toluene.

Suitable vinyl nitriles include, for example, acrylonitrile and derivatives thereof, e.g. methacrylonitrile.

Other suitable vinyl monomers include vinyl pyrollidone, and hydroxyalkyl acrylates and methacrylates, e.g. hydroxyethyl acrylate, hydroxpropylacrylate, hydroxyethyl methacrylate and hydroxypropylmethacrylate.

The ethylenically unsaturated material may include at least one ethylenically unsaturated polymer, usually in combination with at least one ethylenically unsaturated monomer. For example, the ethylenically unsaturated polymer may be an ethylenically unsaturated polyester formed by condensation of at least one ethylenically unsaturated polycarboxylic acid or anhydride, optionally in combination with at least one saturated polycarboxylic acid or anhydride, with at least one polyol.

Where the photopolymerisable composition includes a mixture of an ethylenically unsaturated polyester and an ethylenically unsaturated monomer the polyester and monomer may suitable by present in the composition in a proportion by weight of polyester : monomer of 99:1 to 1:99, preferably 90:10 to 10:90.

We have found that where the ethylenically unsaturated material in the photopolymerisable composition comprises a mixture of an ethylenically unsaturated polyester and an ethylenically unsaturated monomer then, particularly where the reducing agent is an amine, the acceleration in the rate of polymerisation of the ethylenically unsaturated material which is obtained by including a given concentration of reducing agent in the composition is greater the lower is the acid value of the ethylenically unsaturated polyester in the composition.

The ethylenically unsaturated monomer may be, or may include, a polyfunctional monomer polymerisation of which will lead to the production of cross-linked materials. Suitable polyfunctional ethylenically unsaturated monomers include, for example, divinyl benzene, glycol dimethacrylate and a reaction product of a hydroxyalkyl acrylate or methacrylate with an isocyanate-ended adduct of a diol and a diisocyanate, for example, a reaction product of hydroxy ethyl methacrylate and an isocyanate-ended adduct of 4:4'-diphenyl methane diisocyanate and oxypropylated Bisphenol-A.

Where the ethylenically unsaturated material is a solid then it may be convenient, in order to produce a liquid composition, to include in the composition sufficient amount of a suitable diluent. The diluent should, of course, have little or no inhibiting effect on the polymerisation of the ethylenically unsaturated material in the composition.

The compositions of our invention are suitable for the production of shaped articles of polymeric materials, for example sheets, and are particularly suitable for use in the preparation of polymeric materials in the form of films and in particular print films. Thus, as the compositions of our invention are substantially stable such that little or no polymerisation of the ethylenically unsaturated material takes place in the absence of radiation they form can-stable compositions which may be formed into a film, e.g. a paint film, and then caused or allowed to polymerise by exposure to light, e.g. by exposing the film to natural light, e.g. sunlight. When formed into a film and exposed to light the compositions rapidly polymerise.

The compositions of the present invention may contain pigments, which may be organic or inorganic, and stabilisers, for example antioxidants and antiozonants. Where the composition contains a pigment a photosensitiser preferably should be chosen which is excited by radiation having a wavelength which is not absorbed to an excessive extent by the pigment present in the composition.

The invention is illustrated but in no way limited by the following Examples.

EXAMPLES 1 – 20

These examples demonstrate the use as photosensitisers of adducts of 1,3-diphenyl propane trione with alcohols and mercaptans, i.e. adducts of formula

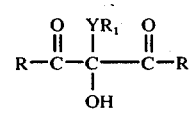

where R is the phenyl group, Y is O or S and $YR_1$ is as shown in the Table below.

Photopolymerisable compositions were prepared by mixing the photosensitiser, ethylenically unsaturated material and, if appropriate, dimethylaminoethyl methacrylate (DMAEM) in such proportions as to give compositions containing 0.2% by weight of the photosensitiser and if appropriate 3% by weight of dimethylaminoethyl methacrylate based on the weight of the ethylenically unsaturated material.

In Examples 1 and 2 the ethylenically unsaturated material was hydroxyethylmethacrylate (HEMA) which also was the alcohol used to form the photosensitiser; in these examples the photosensitiser was formed in situ by adding the appropriate amount of 1,3-diphenyl propane trione to the hydroxyethylmethacrylate. In Examples 3 to 14 the ethylenically unsaturated material was an unsaturated polyester resin available under the trade name Crystic 199; in these examples the photosensitiser was formed in situ by adding 1,3-diphenyl propane trione and the appropriate alcohol or thiol (see the Table below) to the polyester resin. In examples 15 to 20 Crystic 199 again was used but in these examples the photosensitiser was added to the resin as a preformed compound.

Procedure:

A sample (3 to 3.5 g.) of the photopolymerisable composition was placed in a small glass vial which was then suspended at the centre of a ring of eight fluorescent tubes (20 watt Thorn "Black-light" tubes or 20 watt Thorn "Blue-light" tubes — see the Table below). The Thorn "Black-light" tubes emit radiation of wavelength 300–400mμ and the Thorn "Blue-light" tubes emit radiation of wavelength 320–600mμ, with peak radiations at 350mμ and 425mμ respectively. The diameter of the ring of tubes was 8 inches.

| Example No. | Photosensitiser —YR₁ | DMAEM (conc.-%) | Additive (3%) | Light Source Blue/Black | Resin | Gel-Time (minutes) |
|---|---|---|---|---|---|---|
| 1 | $-OCH_2CH_2OC-C(CH_3)=CH_2$ with $\|O\|$ | 3 | — | Black | HEMA | 6 |
| 2 | " | 3 | — | Blue | " | 15 |
| 3 | " | 3 | HEMA | Black | Crystic 199 | 7.5 |
| 4 | $-OCH_2CH_3$ | 3 | $CH_3CH_2OH$ | Blue | " | 15 |
| 5 | $-OCH_3$ | 3 | $CH_3OH$ | Black | " | 2 |
| 6 | $-OCH_3$ | — | $CH_3OH$ | Black | " | 4 |
| 7 | $-OCH_3$ | 3 | $CH_3OH$ | Blue | " | 15 |
| 8 | $-OCH_3$ | 3 | $CH_3OH$ | Black | " | 3 |
| 9 | $-OCH_3$ | — | $CH_3OH$ | Black | " | 4.5 |
| 10 | $-OCH_2CH_2OCH_3$ | 3 | $CH_3OCH_2OH_2OH$ | Black | " | 2.5 |
| 11 | $-SC_8H_{17}$ | 3 | $C_8H_{17}SH$ | Black | " | 4.5 |
| 12 | $-SC_8H_{17}$ | — | $C_8H_{17}SH$ | Black | " | 9.5 |
| 13 | $-SC_8H_{17}$ | 3 | $C_8H_{17}SH$ | Blue | " | 15 |
| 14 | $-SC_8H_{17}$ | — | $C_8H_{17}SH$ | Blue | " | 27 |
| 15 | $-OCH_3$ | 3 | — | Black | " | 4.5 |
| 16 | $-OCH_3$ | — | — | Black | " | 8 |
| 17 | $-OCH_3$ | 3 | $CH_3OH$ | Black | " | 2.5 |
| 18 | $-OCH_3$ | — | $CH_3OH$ | Black | " | 4 |
| 19 | $-OCH_2CH_2OH$ | 4 | — | Black | " | 10 |
| 20 | $-OCH_2CH_2OH$ | — | — | Black | " | 13 |

EXAMPLES 21–23

Example 21

The adduct of indane-1,2,3-trione and methanol, of formula

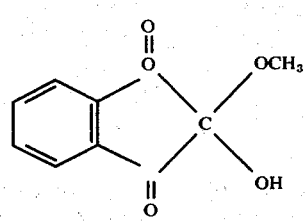

and dimethylaminoethyl methacrylate (DMAEM) were mixed with Crystic 199 resin to yield a composition containing 0.2% by weight of the adduct and 3% by weight of DMAEM based on the weight of the resin. A small sample (3 to 3.5 g) of the composition was placed in a glass vial and irradiated as described in Example 1 with "Black-light". The gel time was greater than 40 minutes.

Example 22

The procedure of Example 21 was repeated except that the dimethylaminoethyl methacrylate was omitted. The gel time was 35 minutes.

Example 23

The procedure of Example 21 was repeated except that the dimethylaminoethyl methacrylate was replaced by 3% by weight of carbon tetrachloride based on the weight of the resin. The gel-time was greater than 40 minutes.

EXAMPLES 24 AND 25

Example 24

A solution of 1,3-dimethyl propane-1,2,3-trione, methanol and dimethylaminoethyl methacrylate (DMAEM) were mixed with Crystic 199 resin in amounts of 3% by weight of DMAEM and 3% by weight of methanol based on the resin and sufficient trione to produce in the mixture approx 0.1% by weight of the resin of an adduct of the trione and methanol of formula

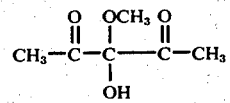

A sample (3 to 3.5 g) of the resulting composition was placed in a glass vial and irradiated as described in Example 1 with Black-light. The gel time of the composition was 20 minutes.

Example 25

The procedure of Example 24 was repeated except that the dimethylaminoethyl methacrylate was omitted. The gel time was 30 minutes.

Example 26

The procedure of Example 5 was repeated except that the amount of the photosensitiser was 0.3% by weight based on the weight of the resin and a different batch of the Crystic 199 resin was employed. The gel time was 4 minutes.

For purposes of comparison a composition was prepared by using a 1:1 mixture of benzoin n-butyl ether and benzoin isopropyl ether (available under the trade name Trigonal 14 from Novodal) with Crystic 199 resin. The composition contained 0.15% by weight based on the resin of the mixed ethers. A sample of the resulting composition was irradiated as described in Example 1, and a gel time of 7 minutes was recorded.

By way of further comparison a composition was prepared by mixing benzoin methyl ether with Crystic 199 resin in amounts such that the composition contained 0.2 to 0.4% by weight of the ether based on the weight of the resin. The gel time was 3.5 minutes.

Example 27

The procedure of Example 24 was repeated except that phenol was used instead of methanol. The amount of the trione was 0.2% by weight based on the resin. The gel time of the composition was 17 minutes.

Example 28

The procedure of Example 24 was repeated except that ethylene glycol dimethacrylate was used instead of the Crystic 199 resin.

The gel time was 1 min 45 seconds.

Example 29

The procedure of Example 24 was repeated except that instead of Crystic 199 resin there was employed a 33% by weight solution in methyl methacrylate monomer of a vinyl urethane having the structure $$A-\underset{\underset{CH_3}{|}}{\overset{\overset{CH_3}{|}}{C}}-A$$

where A is $$CH_2=\underset{\underset{CH_3}{|}}{C}-\overset{O}{\overset{\|}{C}}-OCH_2-CH_2-O-\overset{O}{\overset{\|}{C}}-NH-Ph-CH_2-Ph-NH-\overset{O}{\overset{\|}{C}}-O-\underset{\underset{CH_3}{|}}{OH}-CH_2-O-Ph-$$

The gel time was 8 minutes 15 seconds.

What we claim is:

1. A photopolymerisable composition consisting essentially of at least one polymerisable ethylenically unsaturated material and a photosensitiser present in a concentration in the range of 0.001% to 10% by weight of the ethylenically unsaturated material, said photosensitiser being an addition product of an organic 1,2,3-triketone and an organic alcohol or organic mercaptan, said addition product having the formula $$R-\overset{O}{\overset{\|}{C}}-\underset{\underset{OH}{|}}{\overset{\overset{OR_1}{|}}{C}}-\overset{O}{\overset{\|}{C}}-R \text{ or } R-\overset{O}{\overset{\|}{C}}-\underset{\underset{OH}{|}}{\overset{\overset{SR_1}{|}}{C}}-\overset{O}{\overset{\|}{C}}-R$$

where the groups R and $R_1$ may be same or different and each is a hydrocarbyl group or a substituted hydrocarbyl group or the groups R when taken together form part or the whole of a cyclic structure.

2. A composition as claimed in claim 1 wherein each of the groups R is an aromatic group.

3. A composition as claimed in claim 2 wherein each of the groups R is the phenyl group.

4. A composition as claimed in claim 1 wherein the photosensitiser is the addition product of an organic 1,2,3-triketone and an organic alkanol or substituted alkanol wherein the alkyl group contains from 1 to 20 carbon atoms.

5. A composition as claimed in claim 4 wherein the alkanol is methanol.

6. A composition as claimed in claim 1 wherein the photosensitiser is the addition product of a 1,2,3-triketone and an aromatic alcohol.

7. A composition as claimed in claim 1 wherein the photosensitiser is formed in situ in the ethylenically unsaturated material.

8. A composition as claimed in claim 1 which contains a reducing agent capable of reducing the photosensitiser when the photosensitiser is in an excited state.

9. A composition as claimed in claim 8 wherein the reducing agent has the structure $$R_2-\underset{\underset{}{|}}{\overset{\overset{R_3}{|}}{M}}-R_4$$

where M is an element of Group Vb of the Periodic Table of the Elements and the units $R_2$, $R_3$ and $R_4$, which may be the same or different, are hydrogen atoms, hydrocarbyl groups, substituted hydrocarbyl groups, or groups in which two units R together with the element M form a cyclic ring system, no more than two of the units R being hydrogen atoms and, where the element M is attached directly to an aromatic group R at least one of the other groups R has a $$-\underset{\underset{H}{|}}{\overset{\overset{H}{|}}{C}}-$$

group attached to M.

10. A composition as claimed in claim 9 in which in the reducing agent having the structure $$R_2-\underset{\underset{}{|}}{\overset{\overset{R_3}{|}}{M}}-R_4$$

the groups $R_2$, $R_3$ and $R_4$ are free of aromatic groups attached directly to the element M.

11. A composition as claimed in claim 9 in which, in the reducing agent, the element M is nitrogen.

12. A composition as claimed in claim 11 in which the reducing agent is dimethylaminoethyl methacrylate.

13. A composition as claimed in claim 8 in which the reducing agent is present in a concentration in the range 1% to 5% by weight of the ethylenically unsaturated material in the composition.

14. A composition as claimed in claim 1 in which the ethylenically unsaturated material comprises at least one monomer containing ethylenic unsaturation in a terminal group.

15. A composition as claimed in claim 14 in which the composition includes at least one ethylenically unsaturated polyester.

16. A composition as claimed in claim 1 which includes at least one pigment.

17. A process for the preparation of a polymeric material which comprises irradiating a photopolymerisable composition as claimed in claim 1 with radiation having a wavelength which is capable of exciting the photosensitiser to an excited state.

18. A process as claimed in claim 17 in which the radiation has a wavelength in the range 230 mμ to 600 mμ.

19. A process as claimed in claim 18 in which the radiation is or includes visible light.

* * * * *